United States Patent Office 3,539,771
Patented Nov. 10, 1970

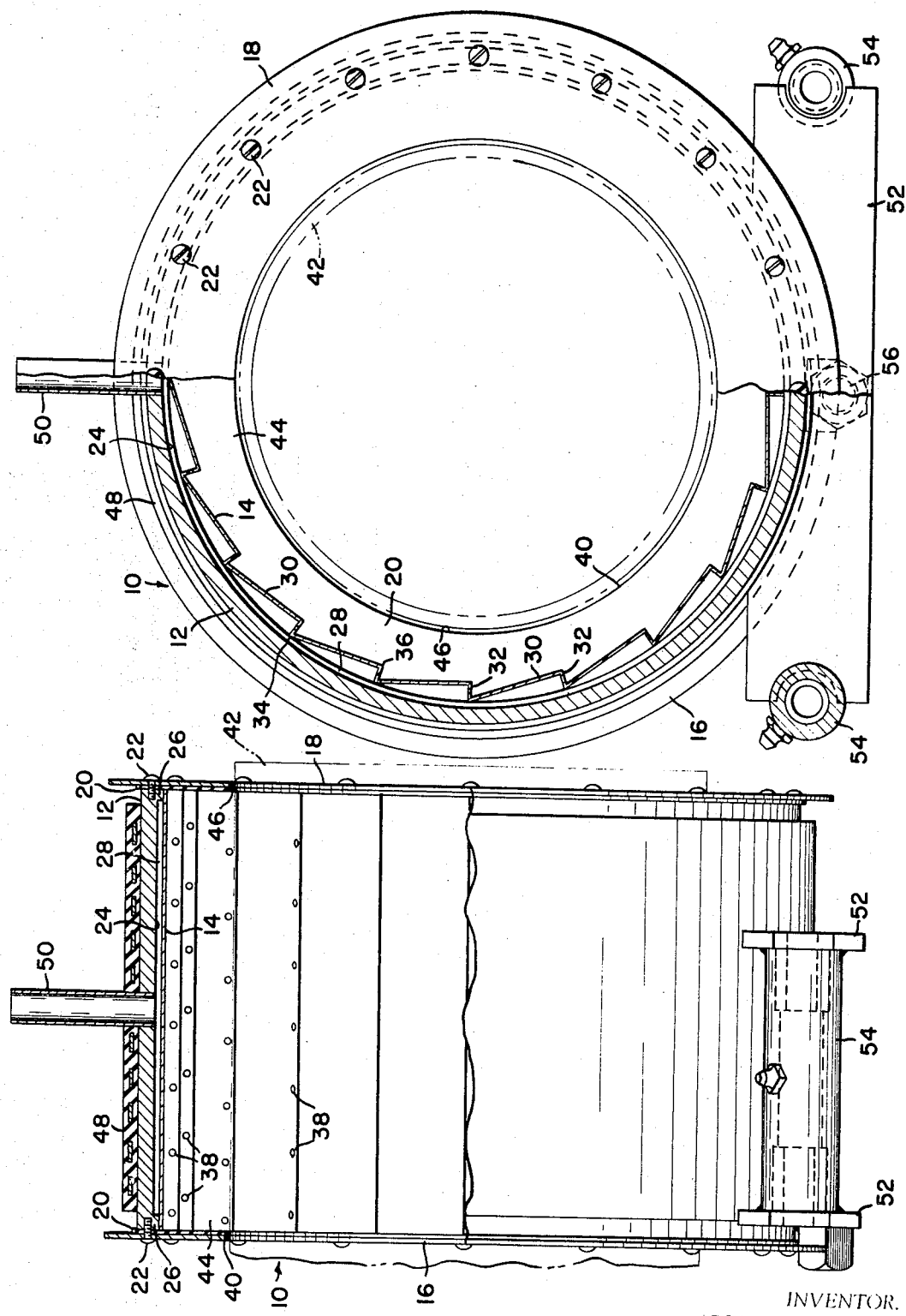

3,539,771
HEATING APPARATUS FOR TREATING PLASTIC PIPE
Ervin C. Zeiser, 380 SE. 1st Terrace,
Pompano Beach, Fla. 33060
Filed Oct. 23, 1967, Ser. No. 677,225
Int. Cl. H05b 1/00
U.S. Cl. 219—373                                    7 Claims

ABSTRACT OF THE DISCLOSURE

A heater for heating plastic tubes and the like has a pair of concentrically arranged spaced annular walls joined together by annular end members to form a pair of concentric chambers. Means are provided to supply a pressurized fluid, preferably air, into the outer chamber and the wall between the chamber is formed with tangential apertures for discharging fluid from the outer chamber into the inner chamber. An electric heating coil surrounds the outer chamber to heat the fluid therein. The end members are provided with aligned, coaxial circular openings through which the end of a pipe to be treated may be passed into the inner chamber. Heated air discharged into the inner chamber whirls about the end of the pipe being treated and escapes through the openings in said end members.

---

This invention relates to heaters, and more particularly to a fluid heater for preheating the ends of plastic tubes and the like in a step of a belling operation.

Plastic tubes or pipes are usually fabricated by an extrusion process, resulting in an elongated tubing of uniform diameter and thickness. In order to interconnect adjoining pipe lengths together, it is customary to provide a bell on one end of a pipe to receive the end of an adjoining pipe in telescopic relation. One well known method of belling a plastic pipe is by preheating one end to a point at which the material becomes pliable, placing a forming die about the heated end and inserting a mandrel within the pipe to force the material into the die and to form the bell.

It is an object of this invention to provide a novel heater, particularly intended, although not limited, to preheat the end of a plastic pipe and the like, which is adapted to be placed in surrounding relation thereto and to bathe the exterior of the pipe with a heated fluid.

It is a further object to provide a novel heater to preheat the end of a plastic pipe and the like in which a fluid, preferably air, is admitted into a first annular chamber, heated therein, and then delivered into a second annular or treating chamber in a whirling motion to preheat the end of a plastic pipe, said plastic pipe forming a wall of the treating chamber.

It is a still further object to provide a novel heater to preheat the end of a plastic pipe and the like which is economical to produce, which is light in construction, and which is very efficient in operation.

The attainment of the above and other objects and advantages is realized by a heater having an annular outer wall and an annular inner wall concentrically thereof and in spaced relation thereto, a pair of end members in abutting relation with the ends of the two annular walls to form a pair of concentric chambers. Tangential apertures in the annular inner wall discharge a fluid from the outer chamber into the inner chamber in a whirling motion. Means are provided to admit a fluid, preferably air, into the outer chamber, and an electrical coil surrounds the outer chamber to heat the fluid therein. A pair of aligned openings through the end members, concentrically of the chambers, permit the passage of the end of a plastic pipe to be treated into the inner chamber. The diameter of the openings in the end members is less than the internal diameter of the annular inner wall and at least one opening has a diameter slightly greater than the external diameter of the plastic pipe to be treated, whereby a second chamber is formed encompassed by the end members, the annular inner member and the exterior surface of the pipe to be treated. The heated air that is discharged into the second or treating chamber whirls about the end of the pipe undergoing treatment and escapes through one or more annular openings formed by the openings in the end members and the outer surface of the pipe.

A clear understanding of the construction and operation of the invention will be gained from the following detailed description and from the accompanying drawings. While the following description relates to the treatment of the ends of plastic pipes and the like, it is obvious that the invention is not so limited, but finds application in many other fields.

Reference is made to the accompanying drawings, in which:

FIG. 1 is a side view of a preferred embodiment of the invention with the upper one-half broken away to reveal the annular inner wall with the tangential apertures therein; and FIG. 2 is an end view of the embodiment shown in FIG. 1 with the left one-half broken away to reveal the interior of the heater.

Referring to the accompanying drawings illustrating a preferred embodiment of the invention as applied to the preheating of one end of a plastic pipe and the like as a step in the formation of a bell on the end of the pipe, the reference numeral 10 designates a fluid heater in its entirety and compirses an annular outer member 12, a concentrically disposed annular inner member 14, and a pair of end members 16 and 18. Gaskets 20 are interposed between the end members 16 and 18 and the ends of the annular members 12 and 14 to prevent leakage of fluid. A series of screws 22 passing through a ring of holes in the end members 16 and 18 and engaging threaded bores in the ends of the annular outer member 12 maintain the parts in assembled relation.

The interior surface of the annular outer member 12 is channelled at 24 to form a pair of end flanges 26 engaging the outer surface of the annular inner member 14 to maintain the latter in concentric relationship. The channeled section 24 forms a first or annular outer chamber 28 to receive fluid as will be explained more fully hereinafter.

The annular inner member 14 is formed into a serrated structure consisting of a series of substantially tangential portions 30 and a series of substantially radial portions 32, forming outwardly projecting teeth 34 and inwardly projecting teeth 36. The serrated formation extends entirely across the annular member 14, and the outwardly projecting teeth 34 engage the end flanges 26 of the annular outer member 12 to retain the outer and inner members in tight concentric relationship.

The inner diameter of the annular outer member or ring 12 is equal to the outer diameter of the ring or circle connecting the outwardly projecting teeth 34 forming the outer diameter of the annular inner member 14, whereby the end flanges 26, formed by the channel 24 in the member 12, contact the projecting teeth 34 when the annular inner member 14 is received within said annular outer member 12 as seen in FIG. 1.

A series of spaced apertures 38 extend across all of the radial portions 32, as shown in FIG. 1, forming a plurality of tangential jets discharging fluid from the annular outer chamber 28.

Each of the end members 16 and 18 has an opening 40 therein, concentrically of the outer end inner members 12 and 14 and coaxial with each other. Each of these openings has a diameter less than the diameter of a circle connecting the tips of the inwardly projecting teeth 36 of the annular inner member 14, and a diameter at least equal to the external diameter of a plastic pipe and the like 42, illustrated in broken lines, so that the end of a plastic pipe may be received within the heater 10. One or both of the openings 40 should have a diameter slightly greater than the external diameter of a plastic pipe 42 to provide one or more annular channels 46 for a purpose to be explained hereinafter. The space encompassed by the annular inner member 14, the external surface of a plastic pipe and the like 42, and the end members 16 and 18 provides a second or inner anular chamber 44 acting as a treating chamber for preheating the end of a plastic pipe and the like 42. An electrical resistance means 48, which may be connected with a source of electrical energy, serves as a heating means for the fluid passing through the fluid heater 10.

A conduit 50, providing a fluid admission means, passes through a bore in the outer annular member 12 and discharges into the first or outer annular chamber 28. The conduit 50 is connected with a source of fluid under pressure, preferably air. If the material being heated cannot be exposed to hot air, it is evident that some inert gas, such as nitrogen or helium may be used.

The heater 10 is carried by a pair of supporting mounts 52, which may be welded to the anular outer member 12. A pair of tubular guide sleeves 54 are connected to the opposite ends of the mounts, as by welding, and receive a pair of guide rods (not shown) to permit axial movement of the heater 10 toward and away from the plastic pipe and the like 42 undergoing treatment. The numeral 56 designates a connection adapted to be attached to an actuating rod of a servomotor (not shown) to reciprocate the heater.

Referring to FIG. 1, it should be noted that the row of apertures 38 in one radial portion 32 is staggered relative to the row of apertures in the adjacent radial portion to assure a well distributed stream of heated fluid into the second annular or treating chamber 44.

The operation of the heater is as follows:

The fluid admitting means 50 is connected to a source of fluid, such as a tank of air under pressure, through a flexible hose, not shown, and the electrical heating means 48 is energized, thereby heating the annular outer member 12. A valve, not shown, is provided to control the supply of air to the heater 10. A plastic pipe and the like 42 is brought into position on a work holding table (not shown) and the heater 10 is axially moved into position to bring it into proper relation surrounding the end of the pipe. The valve (not shown) is operated to admit a controlled supply of air into the annular outer chamber 28, wherein the air is heated to the desired temperature and discharged through the apertures 38 tangentially of the second annular or treating chamber 44 in a whirling motion. The heated air is whirled about the outer surface of the end of a pipe 42 undergoing treatment, uniformly heating the end of the pipe to the desired degree of pliability. The whirling motion of the heated air avoids localized hot spots, and uniformly heats the end of the plastic pipe 42, escaping into the ambient atmosphere through one or both of the annular channels 46.

When the end of the plastic pipe has attained the desired degree of pliability, the supply of air into the heater is terminated and the heater 10 backed off from its position surrounding the end of the pipe, whereupon a mandrel, not shown, may be inserted into the heated end of the pipe 42 to form a bell thereon, in a well known manner.

Having fully described my invention, it is to be understood that I do not wish to be limited to the details set forth herein but that various changes may be made in the details and proportions without departing from the principles of the invention or from the scope of the annexed claims.

I claim:

1. A fluid heater for the ends of plastic pipes and the like, comprising: an annular outer member; an annular inner member concentric with and spaced from said outer member; a pair of end members in abutting relation wtih the ends of said outer and inner members, providing a first annular chamber enclosed by said outer, inner and end members; a circumferential heating means carried by at least one of said members; means admitting a fluid into said first annular chamber; a series of apertures through said inner member; and a concentric and coaxial circular opening through each of said end members, each of said openings having a diameter less than the inner diameter of said inner member and slightly greater than the external diameter of a plastic pipe and the like received within said openings, whereby a second annular chamber is provided between said end members, said inner member and said plastic pipe and the like, to receive heated fluid through said apertures to heat said plastic pipe and the like, said heated fluid being free to escape through the annular space formed between said pipe and the like and said concentric opening in at least one of said end members.

2. A heater for the ends of plastic pipes and the like as defined in claim 1, in which said annular outer member has an inner diameter equal to the outer diameter of said annular inner member to receive said inner member therein, said annular outer member including an annular channel intermediate the ends thereof forming said first annular chamber, the end portions of said annular outer member on either side of said channel forming inturned flanges in abutting relation with said annular inner member to maintain said annular members in concentric relation.

3. A heater for plastic pipes and the like as defined in claim 1, in which said heating means comprises an electric resistance heating element surrounding and in contact with said annular outer member.

4. A heater for the ends of plastic pipes and the like as defined in claim 1, in which the axes of said apertures are disposed tangentially of the circumference of said annular inner member to discharge the heated fluid in a whirling motion into said second annular chamber, said apertures being disposed in a plurality of axially extending rows, the apertures in one row being staggered relative to the apertures in an adjoining row.

5. A heater for the ends of plastic pipes and the like as defined in claim 1, in which said annular inner member includes a series of peripheral serrations forming inwardly and outwardly projecting teeth, said apertures being disposed in said projecting teeth, the tips of the inwardly projecting teeth and the tips of the outwardly projecting teeth lying in concentric circles.

6. A fluid heater for the ends of plastic pipes and the like, comprising: an annular outer member; an annular inner member concentric with and spaced from said outer member, said annular inner member including a series of peripheral serrations forming inwardly and outwardly projecting teeth, the tips of the inwardly projecting teeth and the tips of the outwardly projecting teeth lying in concentric circles, said serrations including a series of interconnected, substantially radial, portions and tangential portions, a series of apertures disposed in said substantially radial portions; a pair of end members in abutting relation with the ends of said annular outer and inner members, providing a first annular chamber enclosed by said outer, inner and end members; a heating means associated with said outer member; means admitting a fluid into said first annular chamber; and a concentric circular opening through each of said end members, each of said openings having a diameter less than the diameter of said annular inner member and at least one opening having a diameter slightly greater than the external diameter of a plastic pipe and the like received within said openings, whereby a second annular chamber is provided between said end members, said inner member and said plastic pipe and the like, to receive heated fluid through said apertures to heat said plastic pipe and the like, said heated fluid being free to escape through the annular space formed between said pipe and the like and said concentric opening in at least one of said end members.

7. A heater for the ends of plastic pipes and the like as defined in claim 6, in which said apertures in one substantially radial portion are staggered relative to the apertures in an adjoining substantially radial portion.

References Cited

UNITED STATES PATENTS

| 3,075,299 | 1/1963 | Bennett et al. | 34—202 |
| 3,121,001 | 2/1964 | Redmer | 34—155 |

FOREIGN PATENTS

| 671,178 | 8/1929 | France. |
| 681,594 | 2/1930 | France. |

ANTHONY BARTIS, Primary Examiner

U.S. Cl. X.R.

34—155, 202; 219—368, 380, 400; 263—4